UNITED STATES PATENT OFFICE.

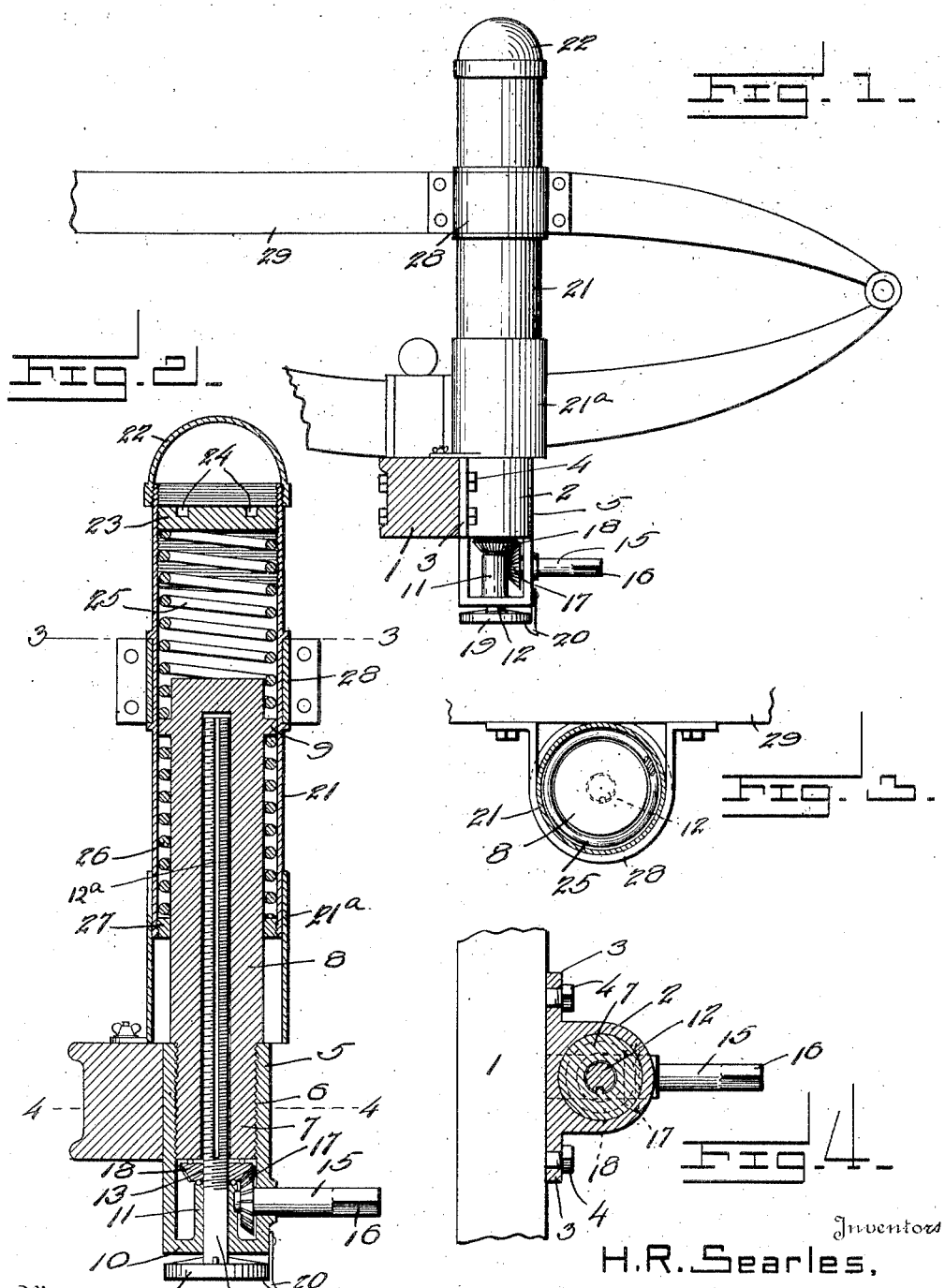

HARRY R. SEARLES, OF YOUNGSTOWN, OHIO, AND CYE A. THURSTON, OF ST. PAUL, MINNESOTA.

COMBINED LIFTING-JACK AND SHOCK-ABSORBER FOR AUTOMOBILES AND LIKE VEHICLES.

1,108,522.   Specification of Letters Patent.   Patented Aug. 25, 1914.

Application filed March 27, 1914. Serial No. 827,618.

*To all whom it may concern:*

Be it known that we, HARRY R. SEARLES and CYE A. THURSTON, citizens of the United States, the former residing at Youngstown, in the county of Mahoning and State of Ohio, and the latter residing at St. Paul, in the county of Ramsey and State of Minnesota, have invented certain new and useful Improvements in Combined Lifting-Jacks and Shock-Absorbers for Automobiles and like Vehicles, of which the following is a specification.

This invention relates to a combination jack, and shock-absorber, especially adapted for use as an accessory for motor vehicles.

The primary object of the invention is, to provide a device of the character referred to, designed to be conveniently supported on the vehicle frame adjacent to its springs to coact with the latter in the absorption of shocks in traveling over uneven roads, and to protect the springs from undue strain or breakage.

A further object of the invention is, to provide a shock-absorber that will also constitute a component part of a jack for elevating the vehicle, and supporting it in elevated position for purposes of repair and tire relief.

The construction of the improved device will be fully described hereinafter in connection with the accompanying drawings which forms a part of this specification; and its features of novelty will be set forth in the appended claims.

In the drawing: Figure 1 is a side elevation of the improvement in position upon an automobile. Fig. 2 is a central vertical section of the same. Fig. 3 is a transverse section on the line 3—3 of Fig. 2, and Fig. 4 is a similar sectional view on the line 4—4 of Fig. 2.

The numeral 1 designates a portion of the axle of an automobile to which is firmly secured a cylindrical housing 2, by means of integral ears 3 and bolts 4. The upper portion 5 of the housing is screw-threaded internally as at 6, to receive the reduced lower end 7 of a tubular core 8, provided near its upper end with an integral collar 9. Projecting upward from the bottom 10 of the housing 2 is a hollow stud 11, through which extends the lower end of a jack-screw 12 externally threaded to engage the internal threads 13 of a bevel gear 18 meshing with a bevel gear 17 on a crank-pin 15. The hollow stud 11 is provided at one side with a bearing for the reception of the reduced inner end of the crank-pin 15, the latter being squared at its outer end 16 for the application of a crank handle. To the lower end of the screw 12 is a bearing foot 19, adapted to be engaged when the screw is in raised position by a spring-catch 20 depending from the housing 2.

Supported upon the tubular core 8 is a cylindrical telescopic casing comprising upper and lower sections 21 and 21ª, the former being externally screw-threaded at its upper end to receive a dome-shaped cover 22, and internally threaded to receive a peripherally-threaded disk 23, formed on its upper side with spanner openings 24 to receive a spanner-wrench for placing, adjusting and removing the disk. Between the disk 23 and the upper end of the tubular core 8 is arranged a coil spring 25, the upper end of which bears against the disk 23, while its lower convolutions encircle the upper end of the core 8, and rest upon the collar 9. Below the collar 9 is a second coil spring 26 surrounding the core 8 and confined between the collar 9, and a threaded annulus 27 secured to internal threads at the lower end of the upper telescopic section 21. The upper end of the section 21 is secured to the chassis 29 by means of a band clip 28, while the lower end is secured by means hereinbefore described.

The operation of the device as a shock-absorber will be readily understood, the interposition of the coil springs 25 and 26 between the vehicle spring members serving to absorb shocks in either direction, and reduce to the minimum the liability of spring breakage. To utilize the device as a jack, the spring catch 20 is first disengaged from the foot 19 of the screw 12, after which the revolution of the crank shaft 15 by a suitable crank-handle or wrench will revolve the screw to raise and lower the vehicle, through the intermediacy of the meshing bevel gears 17 and 18, as will be apparent from the illustration in Fig. 2. Ball bearings are interposed between the gear-wheel 18, and the lower end of the core 8, and the upper end of the hollow stud 11 and said gear wheel 18 to reduce friction. A longitudinal groove 12ª is formed in the screw 12 to receive a guide pin or key projecting within the housing.

The device is susceptible of many modifications in the details of construction, and the invention includes all such variations and detail changes as may properly fall within the scope of the claims.

Having fully described our invention, what we claim as new, and desire to secure by Letters Patent, is:

1. A combination jack and shock-absorber for vehicles, comprising a tubular core having an external collar near its upper end, a jack-screw within said core, a housing below said core, bevel-gears within said housing, one being threaded to engage the screw, a crank-shaft for operating said gears, a telescopic casing the lower section of which is supported on the vehicle axle while the upper section is secured to the chassis, and coil springs disposed within said telescopic sections on opposite sides of said collar.

2. A combination vehicle jack, and shock-absorber comprising a cylindrical housing provided at its lower end with a hollow stud, a tubular core externally-threaded at its lower end to engage said housing, a collar on said tubular core, a jack-screw within said tubular core, intermeshing bevel gears within said housing, a shaft for revolving said gears, a telescopic casing surrounding said tubular core, and having its lower section supported by said housing, and its upper section secured to the chassis, and coil springs disposed within the telescopic sections on opposite sides of said collar.

3. The combination with a vehicle frame and its supporting springs, of a combined jack and shock-absorber comprising a housing secured to said frame, a tubular core externally-threaded to engage said housing, and adapted to coact with a jack-screw, a hollow stud at the lower end of said housing, a loosely keyed jack-screw in said tubular core and having a supporting foot, a catch on said housing to engage said foot, bevel gears within said housing, a crank-shaft for revolving said gears, a telescopic casing surrounding said tubular core, a collar on said tubular core, and coil springs disposed in opposite sides of said collar.

In testimony whereof we affix our signatures in presence of two witnesses.

HARRY R. SEARLES.
CYE A. THURSTON.

Witnesses:
THOS. W. WILLIAMS,
WM. H. BATES.